C. ELLIS.
PROCESS OF CRACKING HEAVY OILS.
APPLICATION FILED APR. 1, 1912. RENEWED JULY 15, 1918.
1,295,825.
Patented Feb. 25, 1919.
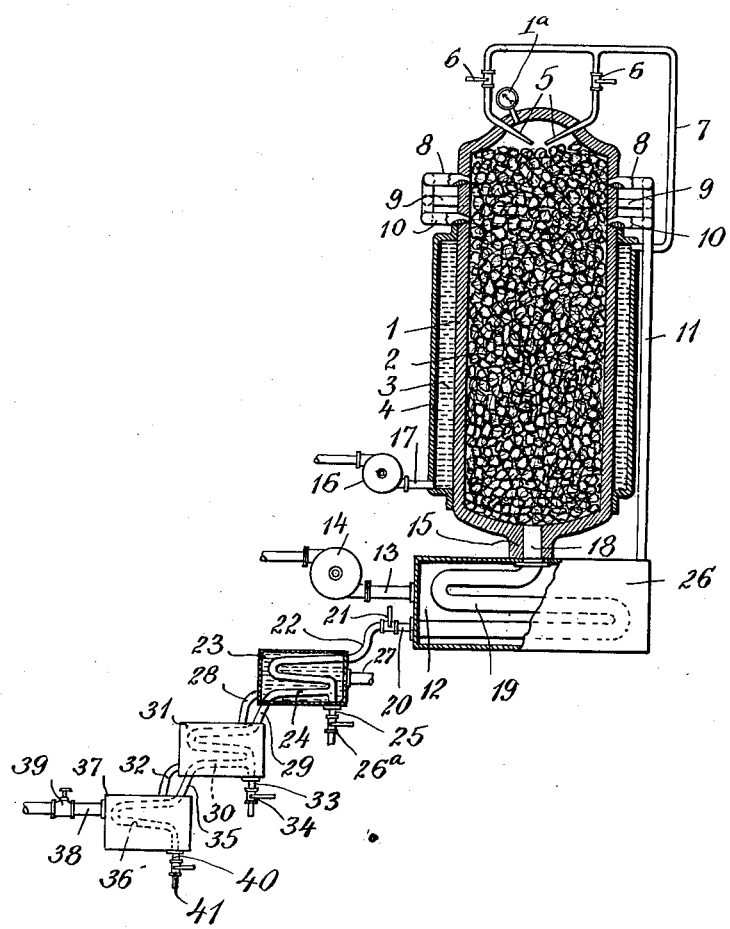

UNITED STATES PATENT OFFICE.

CARLETON ELLIS, OF MONTCLAIR, NEW JERSEY, ASSIGNOR, BY MESNE ASSIGNMENTS, TO SURFACE COMBUSTION, INC., OF WILMINGTON, DELAWARE, A CORPORATION OF DELAWARE.

PROCESS OF CRACKING HEAVY OILS.

1,295,825.　　　　　　　　　Specification of Letters Patent.　　Patented Feb. 25, 1919.

Application filed April 1, 1912, Serial No. 687,771. Renewed July 15, 1918. Serial No. 245,069.

*To all whom it may concern:*

Be it known that I, CARLETON ELLIS, a citizen of the United States, and resident of Montclair, Essex county, New Jersey, have made certain new and useful Inventions Relating to Processes of Cracking Heavy Oils, of which the following is a specification, taken in connection with the accompanying drawings, which form part of the same.

This invention relates especially to processes of cracking heavy oils by injecting or spraying the oil preferably in a preheated condition into contact with a mass of highly heated lumps of refractory material in a suitable chamber to effect the cracking operation, the cracking chamber being kept under a considerable pressure to minimize the production of fixed gases. The vaporized cracked oils may then be passed from the cracking chamber through a cooling coil in an air superheater and then through a series of condensers to progressively condense and separate the lighter oils.

The accompanying drawing is a vertical section showing in a somewhat diagrammatic manner an illustrative apparatus for carrying out this invention.

The preferably vertical cracking chamber 1 may be lined with fireclay or other suitable refractory material and may have a sufficiently heavy jacket to withstand considerable internal pressure. The chamber is preferably filled with lumps of suitable refractory material 2 an inch or so in size and for this purpose firebrick or material high in alumina, such as alundum, corundum, etc., crushed to the desired substantially uniform size, may be used preferably in connection with a coating of suitable refractory catalytic material, such as oxids of thorium or vanadium or precipitated alumina which is desirable for use in this connection. A coating of such precipitated alumina may be attached to the lumps of refractory material as by calcination after a coating of the dry precipitated alumina has been applied to the lumps of refractory material in connection with a relatively small proportion of feldspar or other suitable frit for causing the alumina to adhere to the lumps of refractory material.

The heavy oil, such as fuel or gas oil or stripped crude petroleum, that is, crude oil from which the lighter fractions have been removed, may be advantageously supplied to the cracking chamber by spraying into the upper portion thereof as through a pair of coöperating spraying nozzles 5 directed toward each other and adapted to form a fine spray of oil. These nozzles may be connected with a suitable nozzle pipe 7, the valves 6 serving to regulate the amount of oil delivered from the nozzles. It is usually desirable to preheat the oil before spraying it into the cracking chamber and for this purpose a suitable casing 4 may be arranged around part of the cracking chamber so as to form an oil jacket 3 therein, the oil being fed by a suitable pump, such as 16, into the supply pipe 17 so as to be considerably heated before being forced into the nozzle pipe under heavy pressure to be sprayed into the cracking chamber. Air in amounts suitable for the partial combustion of the heavy oil may be supplied to the cracking chamber adjacent the point of oil injection in any desired way, as for instance, by the air main 11 connected with the air pipe 9 which may extend circumferentially around the chamber and with a series of suitable air injecting nozzles such as 8 which preferably have downwardly directed injecting apertures to deliver the air into the refractory material adjacent the point of oil injection and in such way as to effect the combustion of three to ten per cent. of the oil fuel which burns in an accelerated manner within the porous refractory material in the cracking chamber. This accelerated combustion occurs directly within the granular refractory material itself so as to develop heat therein and also to heat and crack the unconsumed heavy oil. The air may be preheated to the extent desired in any suitable way, as for instance, by forcing the air from the air pump 14 through the pipe 13 into the air chamber 12 of a suitable preheater 26 through which the cooling coil 19 carrying the vaporized treated material from the cracking chamber is passed the desired number of times. This cooling coil may as indicated communicate with the discharge aperture 18 within the neck or lower portion 15 of the cracking chamber and may have its extension 20 provided with a suitable valve 21 to regulate the pressure within the cracking chamber and determine the amount of material which is allowed to flow through the coöperating condensing apparatus. The hot vaporized treated oil in passing through the cooling coil 19 heats the surrounding air to a considerable extent and is thereby cooled sufficiently to promote the subsequent condensation of the oily components.

This condensing apparatus may comprise a series of condensers such as 23 having the condensing coil 24 therein so as to receive the cracked vaporized material from the pipe 22. The oily material condensed in this condenser 23 passes out through the discharge pipe 25 having the valve 26ª. This condensing coil may be cooled by circulating water within the chamber as indicated and any desired number of these condensing chambers may as illustrated in the drawing be connected together in series so as to have a single water circulation. The condensing chambers 31 and 37 may be arranged as illustrated and the water supply pipe 38 having the water valve 39 therein may supply water to the chamber 37 from which this cooling water after being somewhat heated in the first condenser may pass up through the pipe 32 to the condenser 31, the pipe 28 leading this condensing water into the condenser 23 from which it may be discharged through the water discharge pipe 27. The condenser 31 may have the condensing coil 30 therein having its trapped lower end connected with the discharge pipe 33 having the discharge valve 34. The condenser 37 may be similarly provided with the condensing coil 36 having as in the case of the other condensing coils any desired number of turns and communicating with the discharge pipe 40 having the valve 41. In carrying out this oil cracking process the granular material is brought up to a heat sufficient to vaporize the oil (usually 400° to 500° C. or more) by the combustion of the heavy oil or other combustible material and then the heavy oil to be treated is sprayed into the incandescent granular material so as to be simultaneously vaporized, cracked and also burned to the extent of a small percentage sufficient to maintain the granular material at the proper working temperature. The cracking chamber, which may be provided with a pressure gage as at 1ª, is preferably maintained at considerable pressure, of ten pounds or more per square inch, the pressure being preferably between thirty and sixty pounds for ordinary stripped crude petroleum so as to correspondingly minimize the production of the fixed hydrocarbon gases and give a larger output of gasolene, kerosene and the heavier oils desired. The continuous burning of a small proportion of the heavy oil serves in this way to maintain an intense cracking temperature by which the unconsumed oil is treated, the cracking being considerably promoted by the use of the precipitated alumina or other catalytic material which has a desirable action in this connection. The products of this partial combustion naturally pass down through the granular material in the cracking chamber transmitting heat thereto and to the surrounding oil jacket before they are discharged into the cooling coil referred to.

Having described this invention in connection with illustrative forms of apparatus, materials, proportions, pressures and arrangements, to the details of which disclosure the invention is not of course to be limited, what is claimed as new and what is desired to be secured by Letters Patent is set forth in the appended claims:

1. The process of cracking heavy oils such as stripped crude petroleum or the like which consists in spraying the oil through a pair of opposed spraying nozzles into a mass of heated granular refractory material, in injecting into said refractory material below and adjacent the oil delivered thereto heated air to effect the accelerated combustion of three to ten per cent. of said oil and simultaneously heat the refractory material to incandescence, said refractory material consisting substantially of lumps of highly alumious refractory material of about one inch mesh having an adjacent coating of catalytic material comprising precipitated alumina, in maintaining the heated vaporized oil in contact with said refractory material at a pressure of about thirty to sixty pounds per square inch to minimize development of fixed hydrocarbon gases, in passing the vaporized treated oil and products of combustion through such refractory material, in preheating the oil by heat from said refractory material, in heating the air injected from the heated vaporized treated oil and gases from said refractory material and in successively condensing and separating the vaporized treated oil.

2. The process of cracking heavy oils such as stripped crude petroleum or the like which consists in spraying the oil into a mass of heated granular refractory material, in injecting into said refractory material below and adjacent the oil delivered thereto air to effect the accelerated combustion of three to ten per cent. of said oil and simultaneously heat the refractory material to incandescence, said refractory material consisting substantially of lumps of highly aluminous refractory material having an adherent coating of catalytic material comprising precipitated alumina, in maintaining the heated vaporized oil in contact with said refractory material at a pressure of about thirty to sixty pounds per square inch to minimize development of fixed hydrocarbon gases, in passing the vaporized treated oil and products of combustion through such refractory material, in preheating the oil by heat from said refractory material, in heating the air injected from the heated vaporized treated oil and gases from said refractory material and in successively condensing and separating the vaporized oil.

3. The process of cracking heavy oils such as stripped crude petroleum or the like which consists in spraying the oil into a mass of heated granular refractory material, in injecting into said refractory material below and adjacent the oil delivered thereto air to effect the accelerated combustion of a small percentage of said oil and simultaneously heat the refractory material to incandescence, said refractory material consisting substantially of lumps of highly aluminous refractory material having an adherent coating of catalytic material, in maintaining the heating vaporized oil in contact with said refractory material at a pressure of about thirty to sixty pounds per square inch to minimize development of fixed hydrocarbon gases, in passing the vaporized treated oil and products of combustion through such refractory material, in preheating the oil by heat from said refractory material, and in successively condensing and separating the vaporized treated oil.

4. The process of cracking heavy oils such as stripped crude petroleum or the like which consists in injecting the oil into a mass of heated granular refractory material, in injecting into said refractory material below and adjacent the oil delivered thereto air to effect the accelerated combustion of a small percentage of said oil and simultaneously heat the refractory material to incandescence, in maintaining the heated vaporized oil in contact with said refractory material at a pressure of about thirty to sixty pounds per square inch to minimize development of fixed hydrocarbon gases, in passing the vaporized treated oil and products of combustion through such refractory material, in preheating the oil by heat from said refractory material and in successively condensing and separating the vaporized treated oil.

5. The process of cracking heavy oils such as stripped crude petroleum or the like which consists in spraying the oil into a mass of heated granular refractory material, in injecting into said refractory material below and adjacent the oil delivered thereto air to effect the accelerated combustion of three to ten per cent. of said oil and simultaneously heat the refractory material to incandescence, said refractory material consisting substantially of lumps of highly aluminous refractory material having an adherent coating of catalytic material comprising precipitated alumina, in maintaining the heated vaporized oil in contact with said refractory material under pressure to minimize development of fixed hydrocarbon gases, in passing the vaporized treated oil and products of combustion through such refractory material, in preheating the oil by heat from said refractory material, in heating the air injected from the heated vaporized treated oil and gases from said refractory material and in successively condensing and separating the vaporized oil.

6. The process of cracking heavy oils such as stripped crude petroleum or the like which consists in spraying the oil into a mass of heated granular refractory material, in injecting into said refractory material below and adjacent the oil delivered thereto air to effect the accelerated combustion of a small percentage of said oil and simultaneously heat the refractory material to incandescence, said refractory material consisting substantially of lumps of highly aluminous refractory material having an adherent coating of catalytic material, in maintaining the heating vaporized oil in contact with said refractory material under pressure to minimize development of fixed hydrocarbon gases, in passing the vaporized treated oil and products of combustion through such refractory material, in preheating the oil by heat from said refractory material, and in successively condensing and separating the vaporized treated oil.

7. The process of cracking heavy oils such as stripped crude petroleum or the like which consists in injecting the oil into a mass of heated granular refractory material, in injecting into said refractory material below and adjacent the oil delivered thereto air to effect the accelerated combustion of a small percentage of said oil and simultaneously heat the refractory material to incandescence, in maintaining the heated vaporized oil in contact with said refractory material under pressure to minimize development of fixed hydrocarbon gases, in passing the vaporized treated oil and products of combustion through such refractory material, in preheating the oil by heat from said refractory material and in successively condensing and separating the vaporized treated oil.

8. The process of cracking heavy oils which consists in spraying heated heavy oil into a mass of heated granular refractory material consisting substantially of lumps of highly aluminous refractory material comprising attached catalytic material comprising precipitated alumina, in injecting into an adjacent portion of said refractory material preheated air in amounts sufficient to cause the combustion of about three to ten per cent. of the heavy oil to thereby maintain the heat of the surrounding refractory material, in maintaining under pressure the vaporized treated oil in contact with the heated granular material to minimize the production of fixed hydrocarbon gases and in condensing and progressively separating the treated oil from the resulting gaseous material.

9. The process of cracking heavy oils which consists in spraying heavy oil into a mass of heated granular refractory material consisting substantially of lumps of refractory material comprising attached catalytic material comprising precipitated alumina, in injecting into an adjacent portion of said refractory material air in amounts sufficient to cause the combustion of about three to ten per cent. of the heavy oil to thereby maintain the heat of the surrounding refractory material, in maintaining under pressure the vaporized treated oil in contact with the heated granular material to minimize the production of fixed hydrocarbon gases and in condensing and progressively separating the treated oil from the resulting gaseous material.

10. The process of cracking heavy oils which consists in injecting heavy oil into a mass of heated granular refractory material consisting substantially of lumps of refractory material comprising attached catalytic material, in injecting into an adjacent portion of said refractory material air in amounts sufficient to cause the combustion of a small percentage of the heavy oil to thereby maintain the heat of the surrounding refractory material, in maintaining under pressure the vaporized treated oil in contact with the heated granular material to minimize the production of fixed hydrocarbon gases and in condensing and progressively separating the treated oil from the resulting gaseous material.

11. The process of cracking heavy oils, which consists in injecting the oil into a highly heated porous and permeable bed of refractory material, injecting into said bed air to effect combustion of a small percentage of the injected oil to maintain the bed in a highly heated condition, maintaining the vaporized oil in contact with the bed under pressure to minimize the production of fixed hydrocarbon gases, and condensing and withdrawing the treated oil.

12. The process of cracking heavy oils, which consists in injecting the oil into a highly heated porous and permeable bed of refractory material, injecting into said bed air to effect combustion of a small percentage of the injected oil to maintain the bed in a highly heated condition, maintaining the vaporized oil in contact with the bed under pressure to minimize the production of fixed hydrocarbon gases, and progressively condensing and separating from the resulting gaseous material oils of different degrees of volatility.

13. The process of cracking heavy oils, which consists in injecting into a highly heated porous and permeable bed of refractory material the oil to be cracked and sufficient air to effect combustion of a small percentage of the injected oil to maintain the bed in a highly heated condition, causing the vaporized oil and products of combustion to pass through the bed, maintaining the vaporized oil in contact with the bed under pressure to minimize the production of fixed hydrocarbon gases, and condensing and withdrawing the treated oil.

14. The process of cracking heavy oils, which consists in injecting into a highly heated porous and permeable bed of refractory material the oil to be cracked and sufficient air to effect combustion of a small percentage of the injected oil to maintain the bed in a highly heated condition, condensing and withdrawing the treated oil, and maintaining the liquid and vaporized oil under pressure during such cracking and condensation to minimize development of fixed hydrocarbon gases.

15. The process of cracking heavy oils, which consists in heating the oil and vaporizing volatile constituents thereof by heat developed by the combustion of a small percentage of the oil within the vaporizing chamber, conducting away and condensing the treated oil, and maintaining the liquid and vaporized oil under pressure during such heating and condensation to minimize development of fixed hydrocarbon gases.

16. The process of cracking heavy oils, which consists in heating the oil and vaporizing volatile constituents thereof by heat developed by the combustion of a small percentage of the oil in the vaporizing chamber, conducting away and condensing the treated oil, and maintaining the liquid and vaporized oil under a pressure of about thirty to sixty pounds per square inch during such heating and condensation to minimize development of undesirable products.

17. The process of treating heavy petroleum oils or similar oily liquids to obtain therefrom low boiling point products, which consists in heating the same by heat developed by the combustion of a small percentage of the liquid within the treating chamber and distilling off at a high temperature volatile constituents of said liquid, conducting off and condensing said constituents, and maintaining a pressure of several atmospheres on said liquid and the vaporous volatile constituents thereof throughout their course during and while undergoing condensation.

CARLETON ELLIS.

Witnesses:
HARRY L. DUNCAN,
JESSIE B. KAY.